United States Patent
Wu

(10) Patent No.: US 8,472,305 B2
(45) Date of Patent: Jun. 25, 2013

(54) NETWORK CODING-BASED DATA PROCESSING METHOD AND SYSTEM

(75) Inventor: Tao Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/604,408

(22) Filed: Sep. 5, 2012

(65) Prior Publication Data

US 2012/0327846 A1 Dec. 27, 2012

Related U.S. Application Data

(63) Continuation of application No. PCT/CN2011/075212, filed on Jun. 2, 2011.

(30) Foreign Application Priority Data

Sep. 30, 2010 (CN) .......................... 2010 1 0512027

(51) Int. Cl.
  *H04L 5/04* (2006.01)
(52) U.S. Cl.
  USPC ........................................................ 370/204
(58) Field of Classification Search
  USPC ................. 370/203–207, 229, 230, 235, 236, 370/351, 389, 241, 252–253, 392, 912
  See application file for complete search history.

(56) References Cited

U.S. PATENT DOCUMENTS

| 7,197,090 B1 * | 3/2007 | Berger et al. ................. 375/317 |
| 2009/0252146 A1 | 10/2009 | Luo et al. |
| 2010/0008288 A1 * | 1/2010 | Taori et al. .................... 370/315 |
| 2011/0110284 A1 * | 5/2011 | Wu et al. ....................... 370/312 |

FOREIGN PATENT DOCUMENTS

| CN | 101453800 A | 6/2009 |
| CN | 101814974 A | 8/2010 |
| CN | 101843008 A | 9/2010 |
| EP | 2207274 A1 | 7/2010 |
| EP | 2216954 A1 | 8/2010 |

OTHER PUBLICATIONS

International Search Report and Written Opinion of the International Searching Authority issued in corresponding PCT Patent Application No. PCT/CN2011/075212, mailed Sep. 8, 2011.
Extended European Search Report issued in corresponding European Patent Application No. 11783085.1, mailed Jan. 25, 2013.

* cited by examiner

*Primary Examiner* — Omar Ghowrwal
(74) *Attorney, Agent, or Firm* — Brinks Hofer Gilson & Lione

(57) ABSTRACT

The present disclosure provides a network coding-based data processing method and system. The method includes: receiving modulated data packets, the modulated data packets including: a first data packet modulated by using a first constellation map, a second data packet modulated by using a second constellation map, and a third data packet modulated by using a third constellation map; where the first constellation map, the second constellation map, and the third constellation map are capable of minimizing the bit error rate of received signals, and a bit stream transmitted in the third data packet is an Exclusive-OR result of a bit stream transmitted in the first data packet and a bit stream transmitted in the second data packet, that is, $c = a \oplus b$; and obtaining original transmitted data from the received data packets.

6 Claims, 7 Drawing Sheets

A receiving device receives modulated data packets, where the modulated data packets include: a first data packet modulated by using a first constellation map, a second data packet modulated by using a second constellation map, and a third data packet modulated by using a third constellation map; where the first constellation map, the second constellation map, and the third constellation map are capable of minimizing a bit error rate of received signals, and a bit stream transmitted in the third data packet is an Exclusive-OR result of a bit stream transmitted in the first data packet and a bit stream transmitted in the second data packet ⟶ 41

The receiving device obtains original transmitted data from the received data packets ⟶ 42

41 — A receiving device receives modulated data packets, where the modulated data packets include: a first data packet modulated by using a first constellation map, a second data packet modulated by using a second constellation map, and a third data packet modulated by using a third constellation map; where the first constellation map, the second constellation map, and the third constellation map are capable of minimizing a bit error rate of received signals, and a bit stream transmitted in the third data packet is an Exclusive-OR result of a bit stream transmitted in the first data packet and a bit stream transmitted in the second data packet 42 — The receiving device obtains original transmitted data from the received data packets

FIG. 4

NETWORK CODING-BASED DATA PROCESSING METHOD AND SYSTEM

CROSS-REFERENCE TO RELATED APPLICATIONS

This application is a continuation of International Application No. PCT/CN2011/075212, filed on Jun. 2, 2011, which claims priority to Chinese Patent Application No. 201010512027.0, filed on Sep. 30, 2010, both of which are hereby incorporated by reference in their entireties.

FIELD

The present disclosure relates to mobile communications technologies, and in particular, to a network coding-based data processing method and system.

BACKGROUND

Network coding is a technology that better meets the radio bandwidth requirement. Assume that source node A and source node B exchange data packets by using an intermediate node. If network coding is not adopted, source node A transmits data packet a to the intermediate node at time point 1, source node B transmits data packet b to the intermediate node at time point 2, and the intermediate node transmits data packet b to source node A at time point 3 and transmits data packet a to source node B at time point 4. If network coding is adopted, source node A transmits packet a to the intermediate node at time point 1, source node B transmits data packet b to the intermediate node at time point 2, and the intermediate node transmits data packet c, c=xor(a,b)=a⊕b, to both source node A and source node B at time point 3. A comparison of the above two processes shows that after network coding is introduced, a timeslot of resources may be saved and thereby the utilization rate of the spectrum may be greatly improved.

In the prior art, during transmission of data packet a, data packet b, and data packet c, these data packets are transmitted in the same modulation map. However, adopting the same modulation map cannot ensure optimal transmission performance.

SUMMARY

Embodiments of the present disclosure provide a network coding-based data processing method and system for achieving optimal transmission performance.

An embodiment of the present disclosure provides a network coding-based data processing method implemented in a receiving device having a processor. In the method, the receiving device receives data packets, where the data packets include: a first data packet modulated by using a first constellation map, a second data packet modulated by using a second constellation map, and a third data packet modulated by using a third constellation map; where the first constellation map, the second constellation map, and the third constellation map are capable of minimizing the bit error rate of received signals, and a bit stream transmitted in the third data packet c is an Exclusive-OR result of a bit stream transmitted in the first data packet a and a bit stream transmitted in the second data packet b, that is, c=a⊕b. The receiving device then obtains original transmitted data from the received data packets.

An embodiment of the present disclosure provides a network coding-based data processing method, including: setting a candidate constellation map set for a first constellation map, a second constellation map, and a third constellation map; calculating an average theoretical bit error rate of a first data packet and a second data packet in the case of different constellation combinations within the constellation map set; determining a constellation combination corresponding to a minimum average theoretical bit error rate as a combination of the first constellation map, the second constellation map, and the third constellation map to modulate the first data packet by using the first constellation map, modulate the second data packet by using the second constellation map, and modulate a third data packet by using the third constellation map.

An embodiment of the present disclosure provides a receiving device having a processor, including a receiving module configured to receive, by the processor, data packets, where the data packets include: a first data packet modulated by using a first constellation map, a second data packet modulated by using a second constellation map, and a third data packet modulated by using a third constellation map; where the first constellation map, the second constellation map, and the third constellation map are capable of minimizing a bit error rate of received signals, and a bit stream transmitted in the third data packet c is an Exclusive-OR result of a bit stream transmitted in the first data packet a and a bit stream transmitted in the second data packet b, that is, c=a⊕b; and obtaining, by the processor, original transmitted data from the received data packets.

An embodiment of the present disclosure provides a constellation combination obtaining device, including: a setting module, configured to set a candidate constellation map set for a first constellation map, a second constellation map, and a third constellation map; a calculating module, configured to calculate an average theoretical bit error rate of a first data packet and a second data packet in the case of different constellation combinations within the constellation map set; and a determining module, configured to determine a constellation combination corresponding to a minimum average theoretical bit error rate as a combination of the first constellation map, the second constellation map, and the third constellation map to modulate the first data packet by using the first constellation map, modulate the second data packet by using the second constellation map, and modulate a third data packet by using the third constellation map.

An embodiment of the present disclosure provides a network coding-based data processing system, including: a constellation combination obtaining device, configured to obtain a first constellation map corresponding to a first data packet, a second constellation map corresponding to a second data packet, and a third constellation map corresponding to a third data packet; where the first constellation map, the second constellation map, and the third constellation map are capable of minimizing a bit error rate of received signals; a first transmitting device, configured to generate the first data packet, modulate the first data packet by using the first constellation map, and transmit the modulated first data packet; a second transmitting device, configured to generate a second data packet, modulate the second data packet by using the second constellation map, and transmit the modulated second data packet; a third transmitting device, configured to receive the first data packet and the second data packet, perform an Exclusive-OR operation on the first data packet and the second data packet to obtain the third data packet, modulate the third data packet by using the third constellation map, and transmit the modulated third data packet; and a receiving device, configured to receive the modulated first data packet, second data packet, and third data packet to obtain original data.

It can be seen from the above solutions that, according to the network coding-based data processing method and device in the embodiments of the present disclosure, different data packets are modulated in different modulation maps, and the different modulation maps are capable of minimizing the bit error rate of the received signals, thereby achieving optimal system transmission performance.

BRIEF DESCRIPTION OF THE DRAWINGS

To make the solutions of the present disclosure clearer, the accompanying drawings for illustrating various embodiments of the present disclosure are described below. Apparently, the accompanying drawings are for the exemplary purpose only, and persons of ordinary skills in the art may derive other drawings from such accompanying drawings without any creative effort.

FIG. 4 is a schematic flowchart of a method according to a first embodiment of the present disclosure;

DETAILED DESCRIPTION OF THE EMBODIMENTS

Objectives, solutions, and beneficial effects of the embodiments of the present disclosure are described clearly and completely with reference to the accompanying drawings. Evidently, the embodiments are exemplary only, without covering all embodiments of the present disclosure. Persons of ordinary skills in the art can derive other embodiments from the embodiments given herein without making any creative effort, and all such embodiments are covered in the protection scope of the present disclosure.

The network coding technology is applicable to multiple scenarios in a radio communication system. The typical scenarios corresponding to the embodiments of the present disclosure may refer to FIG. 1 to FIG. 3.

Figure 1:
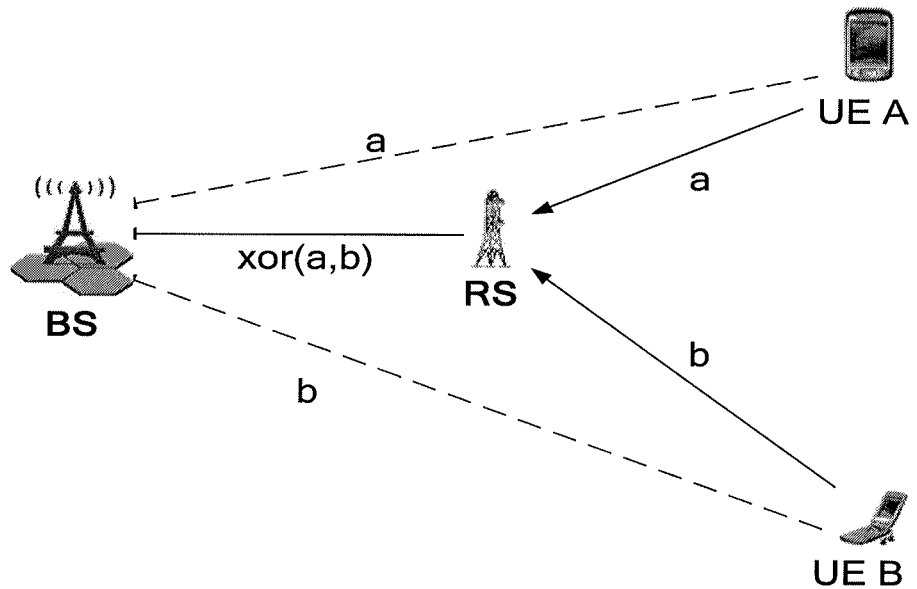
FIG. 1 is a schematic structural diagram of a system in a first scenario according to an embodiment of the present disclosure.

FIG. 1 is a schematic structural diagram of a system in a first scenario according to an embodiment of the present disclosure. Referring to FIG. 1, the system includes a base station (Base Station, BS), a relay station (Relay Station, RS), a first user equipment (UE A), and a second user equipment (UE B). A schematic diagram of the scenario that two user equipments transmit data to a base station by using a relay station is illustrated.

Specifically, at a first time point, UE A transmits data packet a to both the BS and the RS.

At a second time point, UE B transmits data packet b to both the BS and the RS.

At a third time point, the RS transmits data packet c, $c=a \oplus b$, that is, xor(a,b), to the BS, where data packet c is obtained after an Exclusive-OR operation is performed on data packet a and data packet b.

Figure 2:
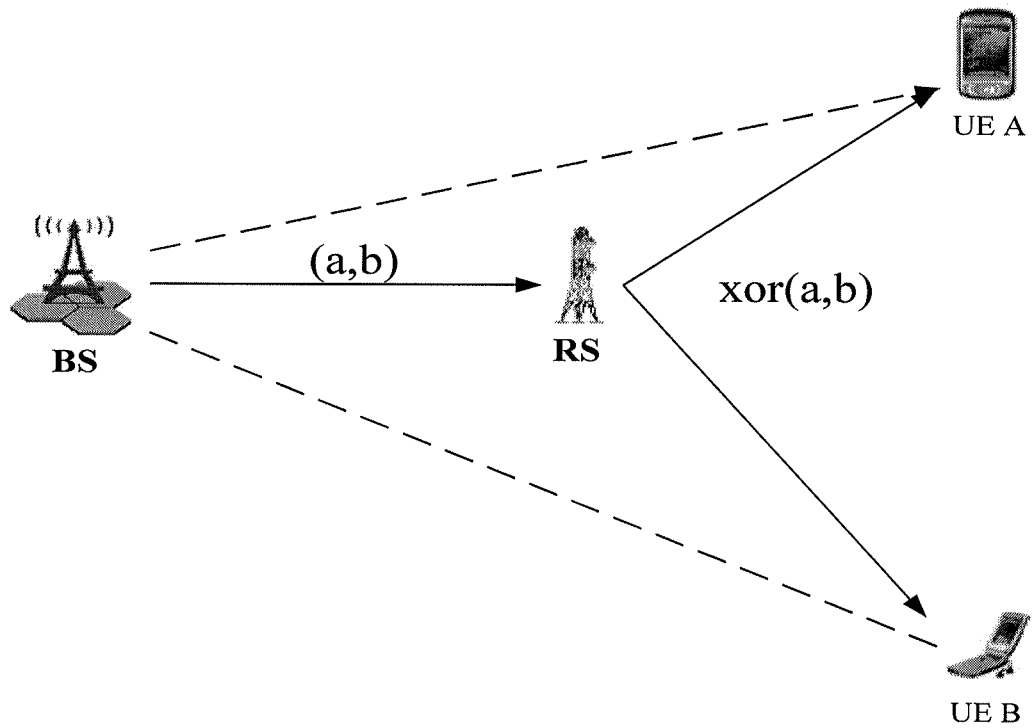
FIG. 2 is a schematic structural diagram of a system in a second scenario according to an embodiment of the present disclosure.

FIG. 2 is a schematic structural diagram of a system in a second scenario according to an embodiment of the present disclosure. Referring to FIG. 2, the system includes a base station (Base Station, BS), a relay station (Relay Station, RS), a first user equipment (UE A), and a second user equipment (UE B). A schematic diagram of the scenario that a base station transmits data to two user equipments by using a relay station is illustrated.

Specifically, at a first time point, the BS transmits data packet a to UE A, UE B, and the RS simultaneously.

At a second time point, the BS transmits data packet b to UE A, UE B, and the RS simultaneously.

At a third time point, the RS transmits data packet c, $c=a \oplus b$, to UE A and UE B, where data packet c is obtained after an Exclusive-OR operation is performed on data packet a and data packet b.

Figure 3:
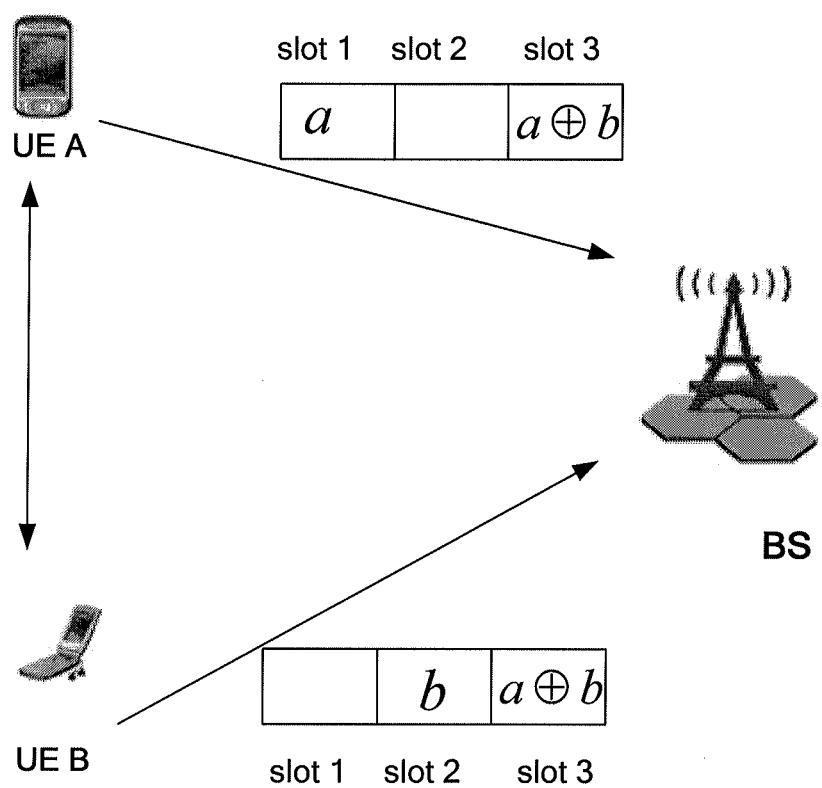
FIG. 3 is a schematic structural diagram of a system in a third scenario according to an embodiment of the present disclosure.

FIG. 3 is a schematic structural diagram of a system in a third scenario according to an embodiment of the present disclosure. Referring to FIG. 3, the system includes a base station (Base Station, BS), a first user equipment (UE A), and a second user equipment (UE B). A schematic diagram of the scenario that two user equipments collaboratively transmit data to a base station is illustrated.

Specifically, at a first time point, UE A transmits data packet a to both UE B and the RS.

At a second time point, UE B transmits data packet b to both UE A and the BS.

At a third time point, UE A and UE B concurrently transmit data packet c, $c=a \oplus b$, to the BS, where data packet c is obtained after an Exclusive-OR operation is performed on data packet a and data packet b.

In the above application scenarios, the data transmission method according to the embodiments of the present disclosure may be used.

FIG. 4 is a schematic flowchart of a method according to an embodiment of the present disclosure, including:

Step 41: A receiving device receives modulated data packets. The modulated data packets include: a first data packet modulated by using a first constellation map, a second data packet modulated by using a second constellation map, and a third data packet modulated by using a third constellation map; where the first constellation map, the second constellation map, and the third constellation map are capable of minimizing a bit error rate of received signals, and a bit stream transmitted in the third data packet is an Exclusive-OR result of a bit stream transmitted in the first data packet and a bit stream transmitted in the second data packet, that is, $c=a \oplus b$, where c is the bit stream transmitted in the third data packet, a is the bit stream transmitted in the first data packet, and b is the bit stream transmitted in the second data packet.

For example, referring to FIG. 1 to FIG. 3, the first data packet is data packet a, the second data packet is data packet b, and the third data packet is data packet c. Specifically, referring to FIG. 1, in an embodiment, the first data packet is a data packet transmitted from a first user equipment to a relay station and a base station; the second data packet is a data packet transmitted from a second user equipment to the relay station and the base station; and the third data packet is a data packet transmitted from the relay station to the base station. Referring to FIG. 2, in an embodiment, the first data packet is a data packet transmitted from a base station to a relay station, a first user equipment, and a second user equipment; the second data packet is a data packet transmitted from the base station to the relay station, the first user equipment, and the second user equipment; and the third data packet is a data packet transmitted from the relay station to the first user equipment and the second user equipment. Referring to FIG. 3, in an embodiment, the first data packet is a data packet transmitted from a first user equipment to a base station and a second user equipment; the second data packet is a data packet transmitted from the second user equipment to the base station and the first user equipment; and the third data packet is a data packet simultaneously transmitted from the first user equipment and the second user equipment to the base station.

In addition, the receiving device refers to a receiving node capable of receiving data packet a, data packet b, and data packet c. For example, in the system shown in FIG. 1, the receiving device is a BS; in the system shown in FIG. 2, the receiving device is two user equipments; and in the system shown in FIG. 3, the receiving device is a BS.

Step 42: The receiving device obtains original transmitted data from the received data packets.

Specifically, in this embodiment of the present disclosure, the original transmitted data may be obtained from the received data packets in a joint demodulation map. The details may refer to the following embodiment.

According to this embodiment, different data packets are modulated in different modulation maps, and the different modulation maps are capable of minimizing the bit error rate of the received signals, thereby achieving optimal system transmission performance.

Based on the system shown in FIG. 1, the signals received by the base station may be expressed as follows:

$$r_1 = h_1 M_1(a) + n_1 = h_1 s_1 + n_1, \text{ where } s_1 = M_1(a)$$

$$r_2 = h_2 M_2(b) + n_2 = h_2 s_2 + n_2, \text{ where } s_2 = M_2(b)$$

$$r_3 = h_3 M_3(c) + n_3 = h_3 s_3 + n_3, \text{ where } s_3 = M_3(c) \quad (1)$$

where:

1) $r_k$ is the signal received by the base station at the time point k=1, 2, 3, $n_k$ is the corresponding noise, and $h_k$ is the corresponding signal response;

2) $s_1$ is the data obtained after data packet a is modulated by using the constellation map $M_1$, $s_2$ is the data obtained after data packet b is modulated by using the constellation map $M_2$, and $s_3$ is the data obtained after data packet a⊕b is modulated by using the constellation map $M_3$; where a and b are transmitted bit streams.

Assume that a channel may be removed from the interference by using an equalizer or only received signals in the case of Gaussian noise are considered, the following formula may be obtained:

$$\hat{r}_1 = s_1 + \hat{n}_1$$

$$\hat{r}_2 = s_2 + \hat{n}_2$$

$$\hat{r}_3 = s_3 + \hat{n}_3 \quad (1)$$

According to formula (2), a three-dimensional received signal may be obtained after the received signals are recombined.

$$r = \hat{r}_1 i_1 + \hat{r}_2 i_2 + \hat{r}_3 i_3 \quad (2)$$

$$= \underbrace{s_1 i_1 + s_2 i_2 + s_3 i_3}_{s} + \underbrace{\hat{n}_1 i_1 + \hat{n}_2 i_2 + \hat{n}_3 i_3}_{n}$$

$$= s + n,$$

where, $i_k$(k=1, 2, 3) is an orthogonal unit vector.

In this embodiment of the present disclosure, for achieving optimal transmission performance, an optimal combination of the first constellation map $M_1$, the second constellation map $M_2$, and the third constellation map $M_3$ needs to be obtained.

Figure 5:
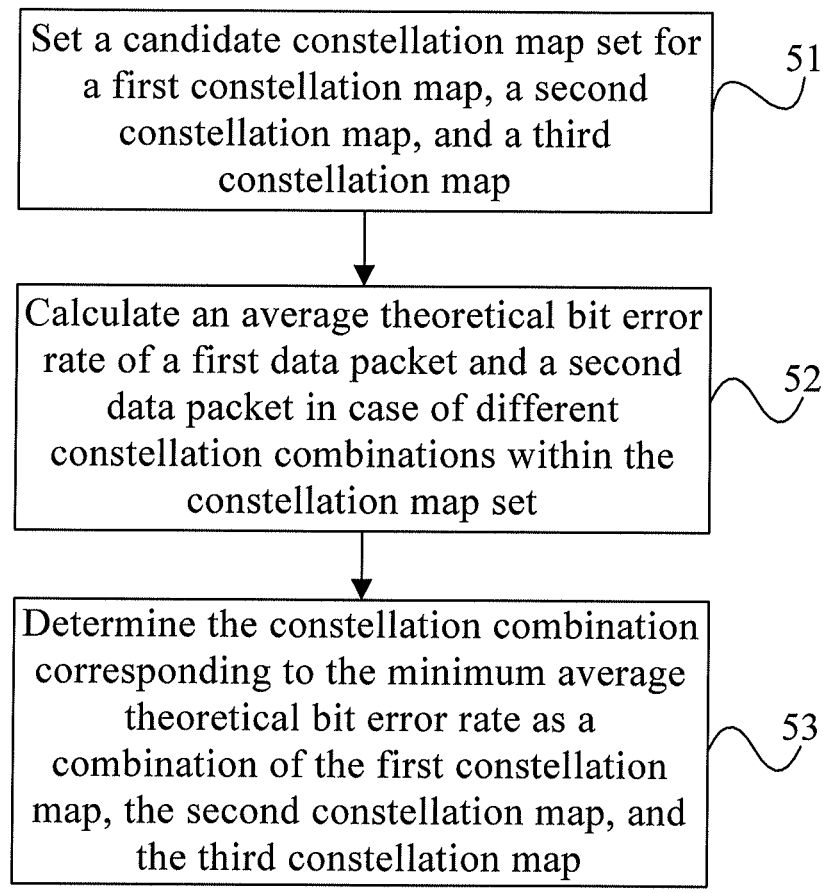
FIG. 5 is a schematic flowchart of a method for obtaining an optimal combination of constellation maps according to an embodiment of the present disclosure.

FIG. 5 is a schematic flowchart of a method for obtaining an optimal combination of constellation maps according to an embodiment of the present disclosure, including:

Step 51: Set a candidate constellation map set for a first constellation map, a second constellation map, and a third constellation map.

A candidate constellation map set is a constellation map set that is composed of a bit stream in a first data packet and a bit stream in a second data packet and the constellation map sets have different effects. Different constellation maps actually indicate different combination relationships between binary bit values and modulation numbers corresponding to the binary bit values. Abstractly, assume that K bi is are to be modulated, and K bit s correspond to $2^K$ different bit sequences, that is, $2^K$ constellation symbols. It is defined that $2^K$ bit sequences are $s_p$ bit sequences, $2^K$ constellation symbols are $s_q$ constellation symbols, p, q=0, 1, ..., $2^K-1$, and each bit sequence is mapped to a constellation symbol. The order of fixed $2^K$ $s_q$ s is not changed, that is, [$s_0, s_1, \ldots, s_{2^K-1}$], a sequence [$s_{p0}, s_{p1}, \ldots, s_{p2^K-1}$] is obtained by adjusting the sequencing order of the $2^K$ $s_{qs}$, and each $s_p$ is mapped to a constellation symbol at the same position. In this map, a constellation map may be obtained. Different constellation maps may be obtained according to the bit sequences in [$s_{p0}, s_{p1}, \ldots, s_{p2^K-1}$]. For example, 4 bits may correspond to 24 constellation maps. However, if two constellation maps differ from each other only in a negative sign, these two constellation maps have the same effect. In this case, the candidate constellation map set includes 12 constellation maps (shown in Table 1).

Step 52: Calculate an average theoretical bit error rate of the first data packet and the second data packet in the case of different constellation combinations within the constellation map set.

The average theoretical bit error rate may be an average theoretical bit error rate in the case of Gaussian channel or ideal equalizer.

Step 53: Determine the constellation combination corresponding to the minimum average theoretical bit error rate as a combination of the first constellation map, the second constellation map, and the third constellation map.

It can be understood that a third data packet is the result after network coding is performed on the first data packet and the second data packet. To be specific, a bit stream transmitted in the third data packet is an Exclusive-OR result of a bit stream transmitted in the first data packet and a bit stream transmitted in the second data packet; the data packets to be actually received are the first data packet and the second data packet (that is, the first and second data packets are obtained by jointly detecting the first data packet, the second data packet, and the third data packet; and the third data packet acts as an auxiliary function when the received signals are jointly detected to obtain the first data packet and the second data packet). Therefore, in this embodiment, only the average theoretical bit error rate of the first data packet and the second data packet needs to be calculated.

The above process of obtaining the optimal constellation combination may be specifically as follows:

For ease of description, it is defined that $$s_p = \sum_{k=1}^{3} s_k^{[p]} i_k,$$

where $s_p$ is a three-dimensional signal combined by three modulated data packets. By using the parameter $s_p$, an average theoretical bit error ratio of the received signals corresponding to data packet a and data packet b may be calculated.

1) The value of the decimal sequence number $p \in 0, 1, \ldots, 2^{2^{K+1}}-1$ is determined by the binary sequence $[a_0 a_1 \ldots a_{2^K-1} b_0 b_1 \ldots b_{2^K-1}]$, number of each constellation point, and $2^{2^K}$ is the number of bits in each data packet;

2) $s_1^{[p]} = M_1(a_0 a_1 \ldots a_{2^K-1})$;
3) $s_2^{[p]} = M_2(b_0 b_1 \ldots b_{2^K-1})$;
4) $s_3^{[p]} = M_3(c_0 c_1 \ldots c_{2^K-1})$, $c_k = a_k \oplus b_k$.
5) $M_q(*)$ indicates that modulation is performed on the bit * by using constellation map $M_q$, where q=1, 2, 3.

For example, if all constellation maps adopt 4-PAM, that is, a, b and c are modulated by 4-PAM, the above description may be expressed as follows:

1) $s_p = \sum_{k=1}^{3} s_k^{[p]} i_k,$ the value of the decimal sequence number $p \in 0, 1, \ldots, 15$ is determined by the binary sequence $[a_0 a_1 b_0 b_1]$, where $a_0, a_1$ is the bit stream in data packet a, and $b_0, b_1$ is the bit stream in data packet b;

2) $s_1^{[p]} = M_1(a_0 a_1)$;
3) $s_2^{[p]} = M_2(b_0 b_1)$;
4) $s_3^{[p]} = M_3(c_0 c_1)$, $c_k = a_k \oplus b_k$.

In this embodiment, in the case of a given constellation combination, the average theoretical bit error rate in the case of Gaussian channel or ideal equalizer may be calculated in the following map:

1) First, the error probability that the transmitted signal $s = s_p$ is incorrectly determined as (p, q$\in$(0, 1, ..., $2^{2^{K+1}}-1$), p$\neq$q) is calculated:

$$\mathcal{P}(s_p \to s_q) = \mathcal{P}(|r - s_q| < |r - s_{\hat{q}}|, \hat{q} \neq q) \qquad (3)$$

$$= \mathcal{P}(|s_p - s_q + n| < |s_p - s_{\hat{q}} + n|, q \neq \hat{q})$$

$$= \mathcal{P}\left(|s_p - s_q|^2 - |s_p - s_{\hat{q}}|^2 + 2 \sum_{k=1}^{3} (s_k^{[\hat{q}]} - s_k^{[q]}) \hat{n}_k > 0, q \neq \hat{q}\right)$$

The above formula is a $2^{2^{K+1}}-1$-dimensional Gauss distribution function, which is difficult to calculate. However, in the case of a high signal to noise ratio, the calculation may be converted to the calculation of:

$$\mathcal{P}(s_p \to s_q) = \mathcal{P}(|r - s_q| < |r - s_{\hat{q}}|, \hat{q} \neq q) \qquad (4)$$

$$\simeq \mathcal{P}\left(|r - s_q| < \underbrace{\frac{1}{2}|s_q - s_{\hat{q}}|}_{d_{min}^{[q]}}, \hat{q} \in \hat{Q}\right)$$

$$= \mathcal{P}\left(\sum_{k=1}^{3} (\hat{n}_k + s_k^p - s_k^q)^2 < |d_{min}^{[q]}|^2\right)$$

$$= 1 - Q_m\left(\frac{s}{\sigma}, \frac{|d_{min}^{[q]}|}{\sigma}\right)$$

The approximate relationship is tenable in the case of a high signal to noise ratio.

The set $\hat{Q}$ includes all constellation points closest to $s_q$, $Q_m(a,b)$ is a normalized Marcum Q function $$Q_m(a, b) = \int_b^\infty x \frac{x^{m-1}}{a} e^{-\frac{(x^2+a^2)}{2}} I_{m-1}(ax) dx,$$

where $I_{m-1}$ is a zero-order Bessel function, and m=2.

2) The average theoretical bit error ratio of the received signals may be expressed as follows:

$$Pb = \frac{1}{L(L-1)} \sum_{p=0}^{L-1} \sum_{q=0, q\neq p}^{L-1} \mathcal{H}(s_p, s_q) \mathcal{P}(s_p \to s_q), \qquad (5)$$

where $L = 2^{2^{K+1}}$, and $H(s_p, s_q)$ is the Hamming distance between the two points.

The average theoretical bit error rate of the received signals corresponding to a and b in the case of different constellation combinations may be calculated according to formula (6). After that, the constellation combination corresponding to the minimum average theoretical bit error rate is selected as the optimal constellation combination in a computer search map.

The following uses 16QAM as an example to describe the specific calculation process.

Assume that the symbols obtained after four bits $a_0 a_1 a_2 a_3$ are modulated are expressed as $M_1(a_0 a_1) + i M_1(a_2 a_3)$, where $M_1$ is the constellation map of PAM-4.

Therefore, the modulation of the received signals by I/Q may be expressed as follows:

$$r_1 = (h_1^{[I]} + h_1^{[Q]} j)(M_1(a_0 a_1) + i M_1(a_2 a_3)) + (n_1^{[I]} + n_1^{[Q]} j)$$

$$r_2 = (h_2^{[I]} + h_2^{[Q]} j)(M_2(b_0 b_1) + i M_2(b_2 b_3)) + (n_2^{[I]} + n_2^{[Q]} j)$$

$$r_3 = (h_3^{[I]} + h_3^{[Q]} j)(M_3(c_0 c_1) + i M_3(c_2 c_3)) + (n_3^{[I]} + n_3^{[Q]} j) \qquad (7),$$

where $c_k = a_k \oplus b_k$.

The received signals in path I and path Q are separately processed. Assume that after interference of a channel is eliminated by using an equalizer, the following formulas may be obtained (using only the I path as an example):

$$\begin{cases} r_{1I} = \left(|h_1^{[I]}|^2 + |h_1^{[Q]}|^2\right)\underbrace{\mathcal{M}_1(a_0a_1)}_{s_1} + \hat{n}_1^{[I]} = h_{1I}s_1 + \hat{n}_1^{[I]} \\ r_{2I} = \left(|h_2^{[I]}|^2 + |h_2^{[Q]}|^2\right)\underbrace{\mathcal{M}_2(b_0b_1)}_{s_2} + \hat{n}_2^{[I]} = h_{2I}s_2 + \hat{n}_2^{[I]} \\ r_{2I} = \left(|h_3^{[I]}|^2 + |h_3^{[Q]}|^2\right)\underbrace{\mathcal{M}_2(c_0c_1)}_{s_3} + \hat{n}_3^{[I]} = h_{3I}s_3 + \hat{n}_3^{[I]} \end{cases} \Rightarrow r_I = \mathcal{M}_1(a_0a_1)i_1 + \mathcal{M}_2(b_0b_1)i_2 + \mathcal{M}_3(c_0c_1)i_3 + \hat{n} \quad (8)$$

During the search, the candidate constellation map set that is set for the first constellation map, the second constellation map, and the third constellation map is as shown in Table 1.

TABLE 1

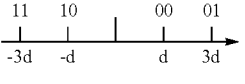

In the set shown in Table 1, the constellation combination corresponding to the minimum average theoretical bit error rate, that is, an optimal combination, may be obtained by searching with a computer, which is as shown in Table 2.

TABLE 2

| Combination 1 | $M = (\Xi_1, \Xi_7, \Xi_1)$ | Combination 2 | $M = (\Xi_1, \Xi_7, \Xi_2)$ | Combination 3 | $M = (\Xi_1, \Xi_8, \Xi_1)$ |
|---|---|---|---|---|---|
| Combination 4 | $M = (\Xi_1, \Xi_8, \Xi_2)$ | Combination 5 | $M = (\Xi_2, \Xi_7, \Xi_1)$ | Combination 6 | $M = (\Xi_2, \Xi_7, \Xi_2)$ |
| Combination 7 | $M = (\Xi_2, \Xi_8, \Xi_1)$ | Combination 8 | $M = (\Xi_2, \Xi_8, \Xi_2)$ | Combination 9 | $M = (\Xi_3, \Xi_5, \Xi_3)$ |
| Combination 10 | $M = (\Xi_3, \Xi_5, \Xi_4)$ | Combination 11 | $M = (\Xi_3, \Xi_6, \Xi_3)$ | Combination 12 | $M = (\Xi_3, \Xi_6, \Xi_4)$ |
| Combination 13 | $M = (\Xi_4, \Xi_5, \Xi_3)$ | Combination 14 | $M = (\Xi_4, \Xi_5, \Xi_4)$ | Combination 15 | $M = (\Xi_4, \Xi_6, \Xi_3)$ |
| Combination 16 | $M = (\Xi_4, \Xi_6, \Xi_4)$ | Combination 17 | $M = (\Xi_5, \Xi_3, \Xi_3)$ | Combination 18 | $M = (\Xi_5, \Xi_3, \Xi_4)$ |
| Combination 19 | $M = (\Xi_5, \Xi_4, \Xi_3)$ | Combination 20 | $M = (\Xi_5, \Xi_4, \Xi_4)$ | Combination 21 | $M = (\Xi_6, \Xi_3, \Xi_3)$ |
| Combination 22 | $M = (\Xi_6, \Xi_3, \Xi_4)$ | Combination 23 | $M = (\Xi_6, \Xi_4, \Xi_3)$ | Combination 24 | $M = (\Xi_6, \Xi_4, \Xi_4)$ |
| Combination 25 | $M = (\Xi_7, \Xi_1, \Xi_1)$ | Combination 26 | $M = (\Xi_7, \Xi_1, \Xi_2)$ | Combination 27 | $M = (\Xi_7, \Xi_2, \Xi_1)$ |
| Combination 28 | $M = (\Xi_7, \Xi_2, \Xi_2)$ | Combination 29 | $M = (\Xi_8, \Xi_1, \Xi_1)$ | Combination 30 | $M = (\Xi_8, \Xi_1, \Xi_2)$ |
| Combination 31 | $M = (\Xi_8, \Xi_2, \Xi_1)$ | Combination 32 | $M = (\Xi_8, \Xi_2, \Xi_2)$ | | |

In addition, if only $\Xi_1$ to $\Xi_4$ show n in Table 1 are candidate constellation maps, that is, only the constellation mapped by a Gray code is included, the optimal combination corresponding to the constellation mapped by the Gray code, that is, the sub-optimal combination compared with Table 2, may be obtained, as shown in Table 3.

TABLE 3

| | | | | | |
|---|---|---|---|---|---|
| Combination 1 | $M = (\Xi_1, \Xi_3, \Xi_1)$ | Combination 2 | $M = (\Xi_1, \Xi_3, \Xi_2)$ | Combination 3 | $M = (\Xi_1, \Xi_3, \Xi_3)$ |
| Combination 4 | $M = (\Xi_1, \Xi_3, \Xi_4)$ | Combination 5 | $M = (\Xi_1, \Xi_4, \Xi_1)$ | Combination 6 | $M = (\Xi_1, \Xi_4, \Xi_2)$ |
| Combination 7 | $M = (\Xi_1, \Xi_4, \Xi_3)$ | Combination 8 | $M = (\Xi_1, \Xi_4, \Xi_4)$ | Combination 9 | $M = (\Xi_2, \Xi_3, \Xi_1)$ |
| Combination 10 | $M = (\Xi_2, \Xi_3, \Xi_2)$ | Combination 11 | $M = (\Xi_2, \Xi_3, \Xi_3)$ | Combination 12 | $M = (\Xi_2, \Xi_3, \Xi_4)$ |
| Combination 13 | $M = (\Xi_2, \Xi_4, \Xi_1)$ | Combination 14 | $M = (\Xi_2, \Xi_4, \Xi_2)$ | Combination 15 | $M = (\Xi_2, \Xi_4, \Xi_3)$ |
| Combination 16 | $M = (\Xi_2, \Xi_4, \Xi_4)$ | Combination 17 | $M = (\Xi_3, \Xi_3, \Xi_1)$ | Combination 18 | $M = (\Xi_3, \Xi_1, \Xi_2)$ |
| Combination 19 | $M = (\Xi_3, \Xi_1, \Xi_3)$ | Combination 20 | $M = (\Xi_3, \Xi_1, \Xi_4)$ | Combination 21 | $M = (\Xi_3, \Xi_2, \Xi_1)$ |
| Combination 22 | $M = (\Xi_3, \Xi_2, \Xi_2)$ | Combination 23 | $M = (\Xi_3, \Xi_2, \Xi_3)$ | Combination 24 | $M = (\Xi_3, \Xi_2, \Xi_4)$ |
| Combination 25 | $M = (\Xi_4, \Xi_1, \Xi_1)$ | Combination 26 | $M = (\Xi_4, \Xi_1, \Xi_2)$ | Combination 27 | $M = (\Xi_4, \Xi_1, \Xi_3)$ |
| Combination 28 | $M = (\Xi_4, \Xi_1, \Xi_4)$ | Combination 29 | $M = (\Xi_4, \Xi_2, \Xi_1)$ | Combination 30 | $M = (\Xi_4, \Xi_2, \Xi_2)$ |
| Combination 31 | $M = (\Xi_4, \Xi_2, \Xi_3)$ | Combination 32 | $M = (\Xi_4, \Xi_2, \Xi_4)$ | | |

After the optimal constellation combination is obtained, the first constellation map, the second constellation map, and the third constellation map in the case of the optimal constellation combination are used to modulate the first data packet, the second data packet, and the third data packet. For example, if combination 1 in Table 3 is used as an example, $\Xi_1$ is used to modulate data packet a, $\Xi_3$ is used to modulate data packet b, and $\Xi_1$ is used to modulate data packet c.

Figure 6:
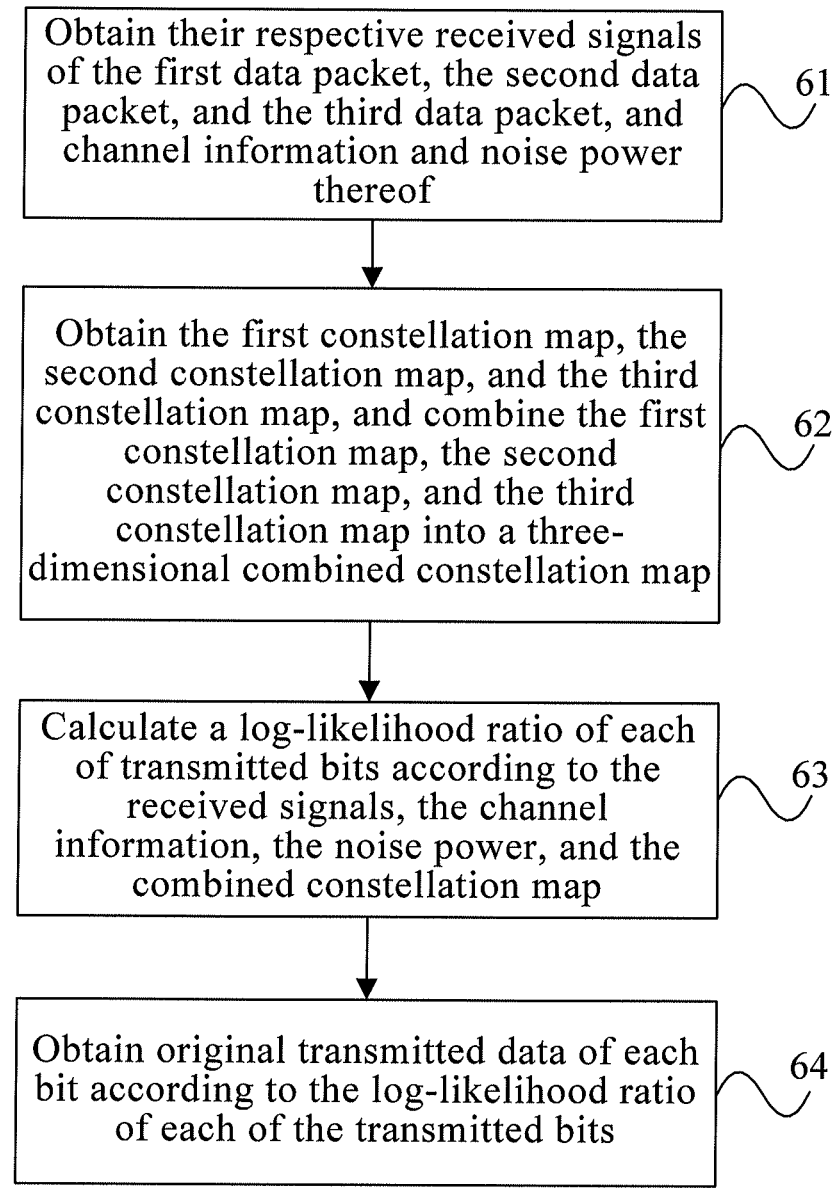
FIG. 6 is a schematic flowchart of a method for obtaining original transmitted data from received data packets according to an embodiment of the present disclosure.

FIG. 6 is a schematic flowchart of a method for obtaining original transmitted data from the received data packets according to an embodiment of the present disclosure, including:

Step 61: Obtain their respective received signals of a first data packet, a second data packet, and a third data packet, and their respective channel information and noise power of the first data packet, the second data packet, and the third data packet.

For example, based on formula (1), the received signal corresponding to the first data packet is $r_1$, the received signal corresponding to the second data packet is $r_2$, and the received signal corresponding to the third data packet is $r_3$. In addition, assume that the channel information corresponding to $r_1$ is $h_1$, and the noise power corresponding to $r_1$ is $\sigma_1^2$; the channel information corresponding to $r_2$ is $h_2$, and the noise power corresponding to $r_2$ is $\sigma_2^2$; and the channel information corresponding to $r_3$ is $h_3$, and the noise power corresponding to $r_3$ is $\sigma_3^2$.

Step 62: Obtain the first constellation map, the second constellation map, and the third constellation map, and combine the first constellation map, the second constellation map, and the third constellation map into a three-dimensional combined constellation map.

The formula for calculating the combined constellation map is as follows: $M = M_1 i_1 + M_2 i_2 + M_3 i_3$.

Figure 7:
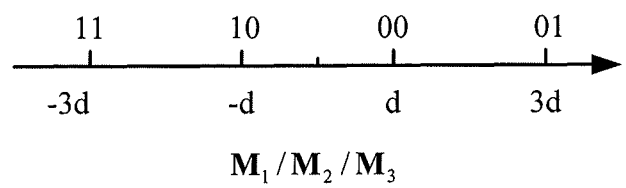
FIG. 7 is a schematic diagram of a constellation map according to an embodiment of the present disclosure.
Figure 8:
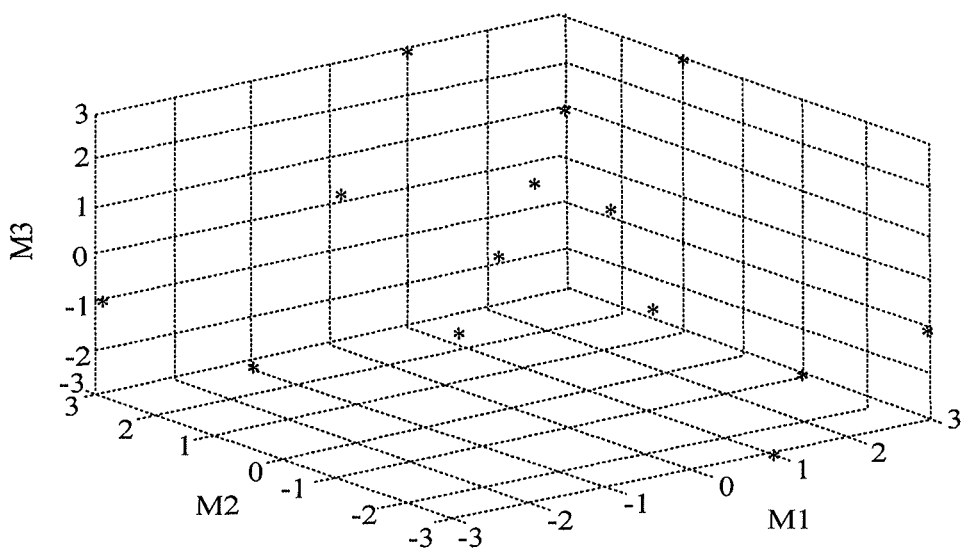
FIG. 8 is a schematic diagram of a combined constellation map according to an embodiment of the present disclosure.

FIG. 7 is a schematic diagram of a constellation map according to an embodiment of the present disclosure. Referring to FIG. 7, assume that $M_1$, $M_2$, and $M_3$ are equal and are shown in FIG. 7, based on the constellation map shown in FIG. 7, the combined constellation map shown in FIG. 8 may be obtained. FIG. 8 is a schematic diagram of a combined constellation map according to an embodiment of the present disclosure. Referring to FIG. 8, relative distribution positions of 16 points are illustrated.

Step 63: Calculate a log-likelihood ratio of each of transmitted bits according to the received signals, the channel information, the noise power, and the combined constellation map.

For example, in the calculation of the log-likelihood ratio (LLR) of $a_0$, the following may be obtained:

$$Pr(a_0 = 1 \mid r_1, r_2, r_3) = \frac{1}{(2\pi)^2 \prod_{k=1}^{3} \sigma_k} \sum_{m \in M(a_0=1)} \left( \prod_{k=1}^{3} \exp\left(-\frac{1}{2} \frac{|r_k - h_k s_k^{[m]}|^2}{\sigma_k^2}\right) \right)$$

$$Pr(a_0 = 0 \mid r_1, r_2, r_3) = \frac{1}{(2\pi)^2 \prod_{k=1}^{3} \hat{\sigma}_k} \sum_{m \in M(a_0=1)} \left( \prod_{k=1}^{3} \exp\left(-\frac{1}{2} \frac{|r_k - h_{kl} s_k^{[m]}|^2}{\sigma_k^2}\right) \right)$$

$$LLR(a_0) = \log\left(\frac{Pr(a_0 = 1 \mid r_l)}{Pr(a_0 = 0 \mid r_l)}\right)$$

Step 64: Obtain original transmitted data of each bit according to the log-likelihood ratio of each of the transmitted bits.

Specifically, if the system does not include channel coding, whether a transmitted value is 0 or 1 may be directly determined according to the LLR (a0). For example, when the LLR (a0) is greater than 0, the original transmitted data of a0 is 0; when the LLR (a0) is smaller than 0, the original transmitted data of a0 is 1. If the system includes channel coding, the LLR (a0) is input to a channel coding module and is decoded to obtain the original data.

Figure 9:
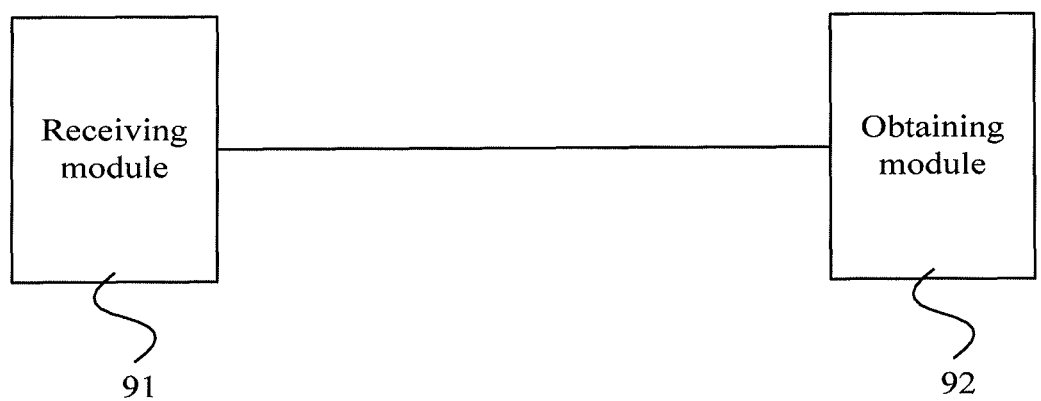
FIG. 9 is a schematic structural diagram of a receiving device according to a second embodiment of the present disclosure.

FIG. 9 is a schematic structural diagram of a receiving device according to a second embodiment of the present disclosure. The receiving device includes a receiving module 91 and an obtaining module 92. The receiving module 91 is configured to receive modulated data packets. The modulated data packets include: a first data packet modulated by using a first constellation map, a second data packet modulated by using a second constellation map, and a third data packet modulated by using a third constellation map; where the first constellation map, the second constellation map, and the third constellation map are capable of minimizing a bit error rate of received signals. The obtaining module 92 is configured to obtain original transmitted data from the received data packets.

The obtaining module 92 may be specifically configured to obtain their respective received signals of the first data packet, the second data packet, and the third data packet, and their respective channel information and noise power of the first data packet, the second data packet, and the third data packet; obtain the first constellation map, the second constellation map, and the third constellation map, and combine the first constellation map, the second constellation map, and the third constellation map into a three-dimensional combined constellation map; calculate a log-likelihood ratio of each of transmitted bits according to the received signals, the channel information, the noise power, and the combined constellation map; and obtain original transmitted data of each bit according to the log-likelihood ratio of each of the transmitted bits.

According to this embodiment, different data packets are modulated in different modulation maps, and the different modulation maps are capable of minimizing the bit error rate of the received signals, thereby achieving optimal system transmission performance.

Figure 10:
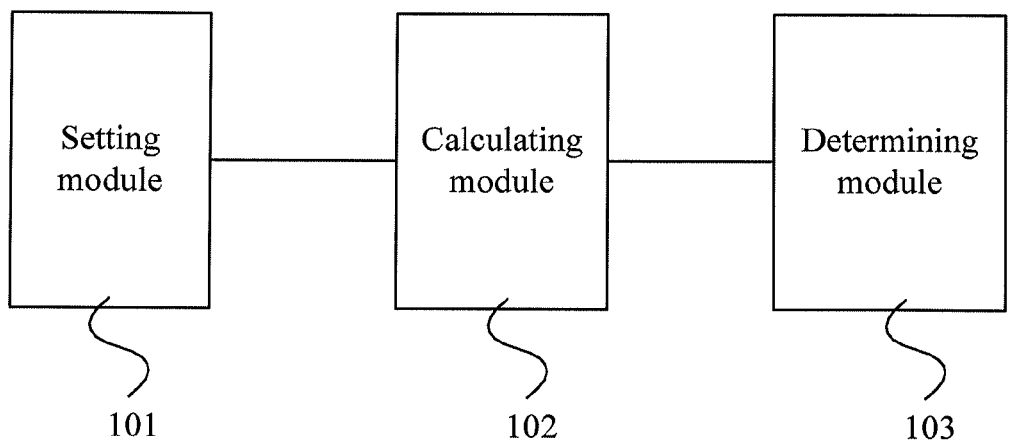
FIG. 10 illustrates a constellation combination obtaining device according to a third embodiment of the present disclosure.

FIG. 10 is a constellation combination obtaining device according to a third embodiment of the present disclosure, including a setting module 101, a calculating module 102, and a determining module 103. The setting module 101 is configured to set a candidate constellation map set for a first constellation map, a second constellation map, and a third constellation map. The calculating module 102 is configured to: in the case of different constellation combinations within the constellation map set, calculate an average theoretical bit error rate, for example, an average theoretical bit error rate of a first data packet and a second data packet in the case of Gaussian channel or ideal equalizer. The determining module 103 is configured to determine a constellation combination corresponding to the minimum average theoretical bit error rate as a combination of the first constellation map, the second constellation map, and the third constellation map to modulate the first data packet by using the first constellation map, modulate the second data packet by using the second constellation map, and modulate a third data packet by using the third constellation map.

According to this embodiment, different data packets are modulated in different modulation maps, and the different modulation maps are capable of minimizing a bit error rate of the received signals, thereby achieving optimal system transmission performance.

Figure 11:
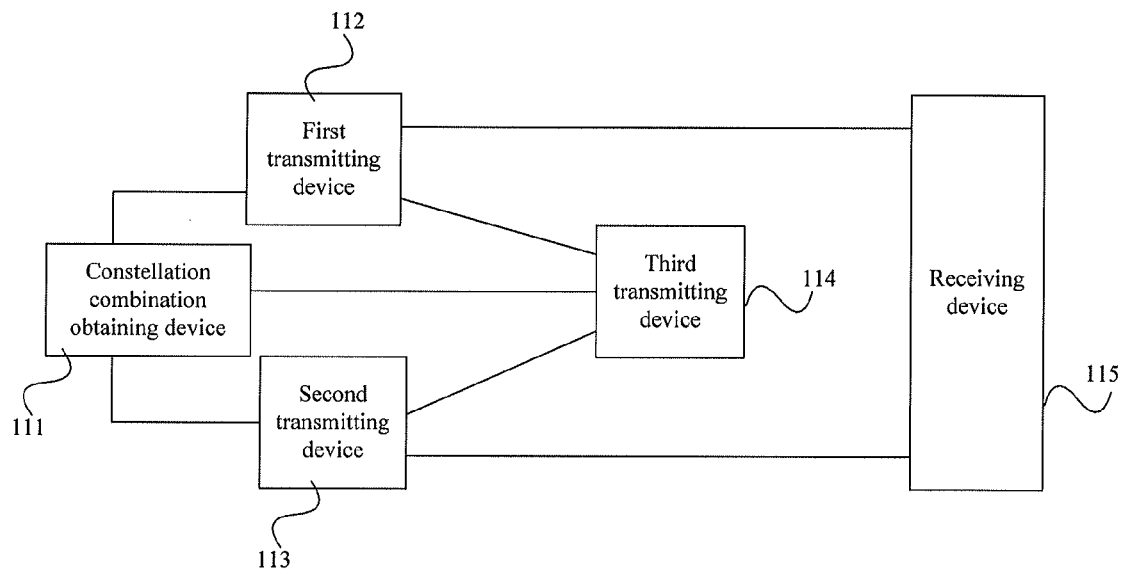
FIG. 11 is a schematic structural diagram of a system according to a fourth embodiment of the present disclosure.

FIG. 11 is a schematic structural diagram of a system according to a fourth embodiment of the present disclosure, including a constellation combination obtaining device 111, a first transmitting device 112, a second transmitting device 113, a third transmitting device 114, and a receiving device 115. The constellation combination obtaining device 111 is configured to obtain a first constellation map corresponding to a first data packet, a second constellation map corresponding to a second data packet, and a third constellation map corresponding to a third data packet; where the first constellation map, the second constellation map, and the third constellation map are capable of minimizing a bit error rate of received signals. The first transmitting device 112 is configured to generate the first data packet, modulate the first data packet by using the first constellation map, and transmit the modulated first data packet. The second transmitting device 113 is configured to generate the second data packet, modulate the second data packet by using the second constellation map, and transmit the modulated second data packet. The third transmitting device 114 is configured to receive the first data packet and the second data packet, perform an Exclusive-OR operation on the first data packet and the second data packet to obtain the third data packet, modulate the third data packet by using the third constellation map, and transmit the modulated third data packet. The receiving device 115 is configured to receive the modulated first data packet, second data packet, and third data packet to obtain original data.

The constellation combination obtaining device 111 may be as shown in FIG. 10, and the receiving device 115 may be as shown in FIG. 9.

According to this embodiment, different data packets are modulated in different modulation maps, and the different modulation maps are capable of minimizing the bit error rate of the received signals, thereby achieving optimal system transmission performance.

It can be understood that the related features in the above methods and devices may be crossly-referenced. In addition, the wording such as "first" and "second" in the embodiments is merely used to differentiate the embodiments of the present disclosure rather than indicating preference of the embodiments.

Persons of ordinary skills in the art may understand that all or part of steps according to the embodiments of the present disclosure may be implemented by a program instructing relevant hardware such as a hardware processor. The programs may be stored in a computer readable storage medium accessible to the hardware processor. When the programs are executed, the steps of the methods in the embodiments are executed by the hardware processor. The storage medium includes any medium capable of storing program codes, such as a read-only memory (ROM), a random access memory (RAM), a magnetic disk or a compact disc-read only memory (CD-ROM).

Finally, it should be noted that the above embodiments are merely provided for describing the solutions of the present disclosure, but not intended to limit the present disclosure. It should be understood by persons of ordinary skill in the art that although the present disclosure has been described in detail with reference to the embodiments, modifications can be made to the solutions described in the embodiments, or equivalent replacements can be made to some features in the solutions, as long as such modifications or replacements do not cause the essence of corresponding solutions to depart from the spirit and scope of the present disclosure.

The invention claimed is:

1. A network coding-based data transmission method, comprising:
    receiving, by a receiving device having a processor, data packets, wherein the data packets comprise: a first data packet modulated by using a first constellation map, a second data packet modulated by using a second constellation map, and a third data packet modulated by using a third constellation map; wherein the first constellation map, the second constellation map, and the third constellation map are capable of minimizing a bit error rate of received signals, and a bit stream transmitted in the third data packet c is an Exclusive-OR result of a bit stream transmitted in the first data packet a and a bit stream transmitted in the second data packet b, that is, c=a⊕b; and
    obtaining, by the receiving device, original transmitted data from the received data packets;
    wherein the first constellation map, the second constellation map, and the third constellation map are a combination of constellation maps in a set candidate constellation map set when an average theoretical bit error rate of the first data packet and the second data packet is minimum.

2. The method according to claim 1, wherein the minimum average theoretical bit error rate of the first data packet and the second data packet is a minimum average theoretical bit error rate in the case of Gaussian channel or ideal equalizer.

3. A network coding-based data transmission method, comprising:
    receiving, by a receiving device having a processor, data packets, wherein the data packets comprise: a first data packet modulated by using a first constellation map, a second data packet modulated by using a second constellation map, and a third data packet modulated by using a third constellation map; wherein the first constellation map, the second constellation map, and the third constellation map are capable of minimizing a bit error rate of received signals, and a bit stream transmitted in the third data packet c is an Exclusive-OR result of a bit stream transmitted in the first data packet a and a bit stream transmitted in the second data packet b, that is, $c=a \oplus b$; and obtaining, by the receiving device, original transmitted data from the received data packets;

wherein the obtaining original transmitted data from the received data packets comprises:

obtaining respective received signals of the first data packet, the second data packet, and the third data packet, and respective channel information and noise power of the first data packet, the second data packet, and the third data packet;

obtaining the first constellation map, the second constellation map, and the third constellation map, and combining the first constellation map, the second constellation map, and the third constellation map into a three-dimensional combined constellation map;

calculating a log-likelihood ratio of each of transmitted bits according to the received signals, the channel information, the noise power, and the combined constellation map; and obtaining original transmitted data of each bit according to the log-likelihood ratio of each of the transmitted bits.

4. A network coding-based data transmission method, comprising:

receiving, by a receiving device having a processor, data packets, wherein the data packets comprise: a first data packet modulated by using a first constellation map, a second data packet modulated by using a second constellation map, and a third data packet modulated by using a third constellation map; wherein the first constellation map, the second constellation map, and the third constellation map are capable of minimizing a bit error rate of received signals, and a bit stream transmitted in the third data packet c is an Exclusive-OR result of a bit stream transmitted in the first data packet a and a bit stream transmitted in the second data packet b, that is, $c=a \oplus b$; and obtaining, by the receiving device, original transmitted data from the received data packets;

wherein, the first data packet is a data packet transmitted from a first user equipment to a relay station and a base station;

the second data packet is a data packet transmitted from a second user equipment to the relay station and the base station; and the third data packet is a data packet transmitted from the relay station to the base station.

5. A network coding-based data transmission method, comprising:

receiving, by a receiving device having a processor, data packets, wherein the data packets comprise: a first data packet modulated by using a first constellation map, a second data packet modulated by using a second constellation map, and a third data packet modulated by using a third constellation map; wherein the first constellation map, the second constellation map, and the third constellation map are capable of minimizing a bit error rate of received signals, and a bit stream transmitted in the third data packet c is an Exclusive-OR result of a bit stream transmitted in the first data packet a and a bit stream transmitted in the second data packet b, that is, $c=a \oplus b$; and obtaining, by the receiving device, original transmitted data from the received data packets;

wherein, the first data packet is a data packet transmitted from a base station to a relay station, a first user equipment, and a second user equipment;

the second data packet is a data packet transmitted from the base station to the relay station, the first user equipment, and the second user equipment; and the third data packet is a data packet transmitted from the relay station to the first user equipment and the second user equipment.

6. A receiving device having a processor, comprising:

a receiving module, configured to receive, by the processor, data packets, wherein the data packets comprise: a first data packet modulated by using a first constellation map, a second data packet modulated by using a second constellation map, and a third data packet modulated by using a third constellation map; wherein the first constellation map, the second constellation map, and the third constellation map are capable of minimizing a bit error rate of received signals, and a bit stream transmitted in the third data packet c is an Exclusive-OR result of a bit stream transmitted in the first data packet a and a bit stream transmitted in the second data packet b, that is, $c=a \oplus b$; and an obtaining module, configured to obtain, by the processor, original transmitted data from the received data packets;

wherein the obtaining module is specifically configured to:

obtain respective received signals of the first data packet, the second data packet, and the third data packet, and respective channel information and noise power of the first data packet, the second data packet, and the third data packet;

obtain the first constellation map, the second constellation map, and the third constellation map, and combine the first constellation map, the second constellation map, and the third constellation map into a three-dimensional combined constellation map;

calculate a log-likelihood ratio of each of transmitted bits according to the received signals, the channel information, the noise power, and the combined constellation map; and obtain original transmitted data of each bit according to the log-likelihood ratio of each of the transmitted bits.

* * * * *